(12) United States Patent
Lee

(10) Patent No.: US 7,390,000 B2
(45) Date of Patent: Jun. 24, 2008

(54) LATERAL LINK FOR VEHICLE SUSPENSION SYSTEMS

(75) Inventor: Cheol-Woo Lee, Hwaseong-si (KR)

(73) Assignee: Kia Motors Corporation, Seoul (KR)

( * ) Notice: Subject to any disclaimer, the term of this patent is extended or adjusted under 35 U.S.C. 154(b) by 414 days.

(21) Appl. No.: 11/302,069

(22) Filed: Dec. 12, 2005

(65) Prior Publication Data

US 2007/0085294 A1    Apr. 19, 2007

(30) Foreign Application Priority Data

Oct. 19, 2005    (KR)    ........................ 10-2005-0098424

(51) Int. Cl.
*B60G 7/02* (2006.01)
*B60G 9/02* (2006.01)
*B60G 21/055* (2006.01)

(52) U.S. Cl. .................. 280/124.103; 280/124.107; 280/124.111

(58) Field of Classification Search .............. 280/5.509, 280/124.103, 124.106, 124.107, 124.11, 280/124.111
See application file for complete search history.

(56) References Cited

U.S. PATENT DOCUMENTS

| | | | | |
|---|---|---|---|---|
| 2,152,938 A | * | 4/1939 | Welch | 280/124.103 |
| 2,261,821 A | * | 11/1941 | Altemus | 280/5.521 |
| 2,349,175 A | * | 5/1944 | Kolbe | 280/124.103 |
| 2,621,920 A | * | 12/1952 | Hogsten et al. | 267/44 |
| 2,942,893 A | * | 6/1960 | Nallinger | 280/124.111 |
| 3,329,233 A | * | 7/1967 | Kolbe | 180/440 |
| 4,573,702 A | * | 3/1986 | Klem | 280/5.504 |
| 5,016,905 A | * | 5/1991 | Licari | 280/677 |
| 5,445,404 A | * | 8/1995 | Shida et al. | 280/124.116 |
| 5,456,486 A | * | 10/1995 | Lee | 280/124.107 |
| 6,357,768 B1 | * | 3/2002 | Chan et al. | 280/124.106 |
| 7,192,034 B2 | * | 3/2007 | Radke et al. | 280/6.159 |
| 7,229,094 B2 | * | 6/2007 | Miller et al. | 280/677 |
| 2004/0169345 A1 | * | 9/2004 | Fontdecaba Buj | 280/124.16 |
| 2006/0208444 A1 | * | 9/2006 | Johnson et al. | 280/124.111 |

FOREIGN PATENT DOCUMENTS

| | | | |
|---|---|---|---|
| DE | 3634090 | | 4/1988 |
| EP | 1 199 195 A2 | | 4/2002 |
| JP | 04300711 A | * | 10/1992 |
| JP | 05016631 A | * | 1/1993 |
| JP | 05104923 A | * | 4/1993 |
| JP | 05169944 A | | 7/1993 |
| JP | 5246223 | | 9/1993 |
| JP | 05319049 A | * | 12/1993 |
| JP | 7108809 | | 4/1995 |
| JP | 7232524 | | 9/1995 |
| KR | 1020030050602 | | 6/2003 |

* cited by examiner

*Primary Examiner*—Christopher Bottorff
*Assistant Examiner*—Laura Freedman
(74) *Attorney, Agent, or Firm*—Morgan Lewis & Bockius LLP

(57) ABSTRACT

The present invention provides a lateral link for suspension systems wherein the distance between opposite ends of the lateral link increases in a tight or sudden turn, so as to enhance controllability, stability, and riding comfort of the vehicle.

5 Claims, 2 Drawing Sheets

LATERAL LINK FOR VEHICLE SUSPENSION SYSTEMS

CROSS-REFERENCE TO RELATED APPLICATIONS

This application claims priority of Korean Patent Application No. 10-2005-0098424, filed on Oct. 19, 2005, with the Korean Intellectual Property Office, the disclosure of which is fully incorporated herein by reference.

FIELD OF THE INVENTION

The present invention relates generally to vehicle suspension systems.

BACKGROUND OF THE INVENTION

Suspension systems for vehicles are devices that prevent vibrations or impacts from being directly transmitted from the road to a vehicle body when it is traveling so as to prevent damage to the vehicle body and cargo and enhance the riding comfort of the vehicle. One type of suspension system that has been widely used is the solid axle rear suspension system, i.e. rigid beam or rigid axle rear suspension system, which utilizes a single piece of metal as a common axle for both wheels sprung beneath the car's undercarriage. Pivots located between the axle and the wheel spindles allow the wheels to swivel on each end. These suspension systems can be further classified by the types of springs employed, e.g. parallel leaf spring type using leaf springs, coil spring type, link type in which a plurality of links is combined, torsion beam type using a cross beam as an axle, etc.

Solid axle rear suspension has a simple and strong design, offering great load bearing capacity. In addition, variations of tread and camber are relatively small when the wheels undergo vertical movement. However, since both wheels in a solid axle suspension share the same axle, the up or down movement of one wheel causes a like movement in the other wheel, thereby detracting from the riding comfort and steering ability of the vehicle. Therefore, there is a need in the art for improvements to suspension systems which provide stability and greater control of the vehicle.

SUMMARY OF THE INVENTION

The present invention provides an improvement to vehicle suspension systems which has a variable-length structure and a lateral link component, so as to prevent a vehicle body from tilting suddenly in a tight turn, thus mitigating a jack-up state of the vehicle and markedly enhancing controllability and traveling stability of the vehicle. These and other objects, features, and advantages of the invention will be apparent to those of skill in the art based on this disclosure in conjunction with the accompanying drawings.

In some embodiments of the present invention, the lateral link for vehicle suspension systems comprises the following basic structural components: (a) an axle coupling link which is rotatably coupled at a first end to a rear axle of a vehicle; (b) a body coupling link which is rotatably coupled at a first end to a second end of the axle coupling link and is rotatably coupled at a second end to a lower portion of the vehicle body at a position opposite a joint between the rear axle and the axle coupling link; and (c) a connection link which limits the angle of rotation of the axle coupling link and the body coupling link with respect to one another. The connection link is rotatably coupled at a first end to the axle coupling link and positioned at a predetermined distance from the joint between the axle coupling link and the body coupling link and spaced apart from the joint between the rear axle and the axle coupling link. The connection link is coupled at a second end thereof to a guide groove formed in the body coupling link, such that the second end of the connection link is rotatably and linearly movable in the guide groove. The connection link approximates a U-shaped structure and positioned with the medial portion protruding towards the vehicle body.

DETAILED DESCRIPTION OF THE PREFERRED EMBODIMENTS

Figure 1:
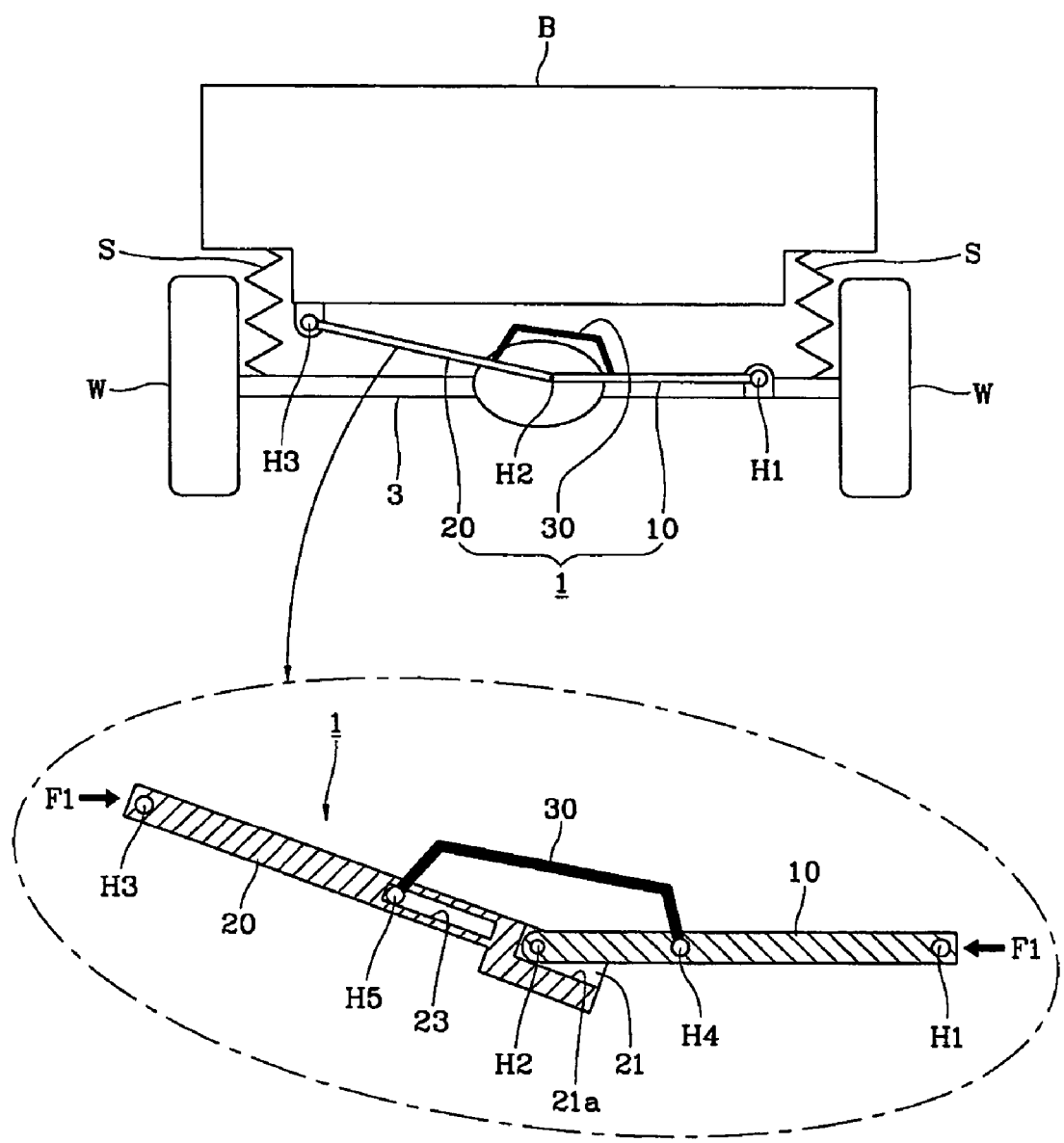
FIG. 1 shows a schematic of a lateral link for rear suspension systems according to a preferred embodiment of the present invention.

In some embodiments of the present invention, as shown in FIG. 1, the lateral link 1 of the present invention includes an axle coupling link 10, a body coupling link 20, and a connection link 30. The axle coupling link 10 is disposed parallel to a rear axle 3 and is rotatably coupled at a first end to the rear axle 3 using a hinge H1. The body coupling link 20 is rotatably coupled at a first end to a second end of the axle coupling link 10 using a hinge H2. Using a hinge H3, a second end of the body coupling link 20 is rotatably coupled to a lower portion of a vehicle body B at a position opposite the hinge H1, i.e. the joint between rear axle 3 and the axle coupling link 10.

As illustrated in FIG. 1, a coupling groove 21 is formed in the first end of the body coupling link 20 in such a way that the second end of the axle coupling link 10 can rest in the coupling groove 21 when the axle coupling link 10 and body coupling link 20 are parallel to one another. A bottom portion 21a of the coupling groove 21 serves to limit the angle of rotation of the body coupling link 20 along with the connection link 30 when the body coupling link 20 is rotated in a counterclockwise direction around the hinge H3, i.e. the joint between the body coupling link 20 and the vehicle body B.

In preferred embodiments, the connection link 30 is rotatably coupled at a first end to the axle coupling link 10 by a hinge H4 at a position spaced apart from the hinge H2, i.e. the joint between the axle coupling link 10 and the body coupling link 20, and the hinge H1, i.e. the joint between rear axle 3 and the axle coupling link 10. The connection link 30 is rotatably coupled at a second end to a guide slot 23, formed in the body coupling link 20, by a hinge H5, such that the second end of the connection link 30 is restricted to movement along guide slot 23.

Figure 2:
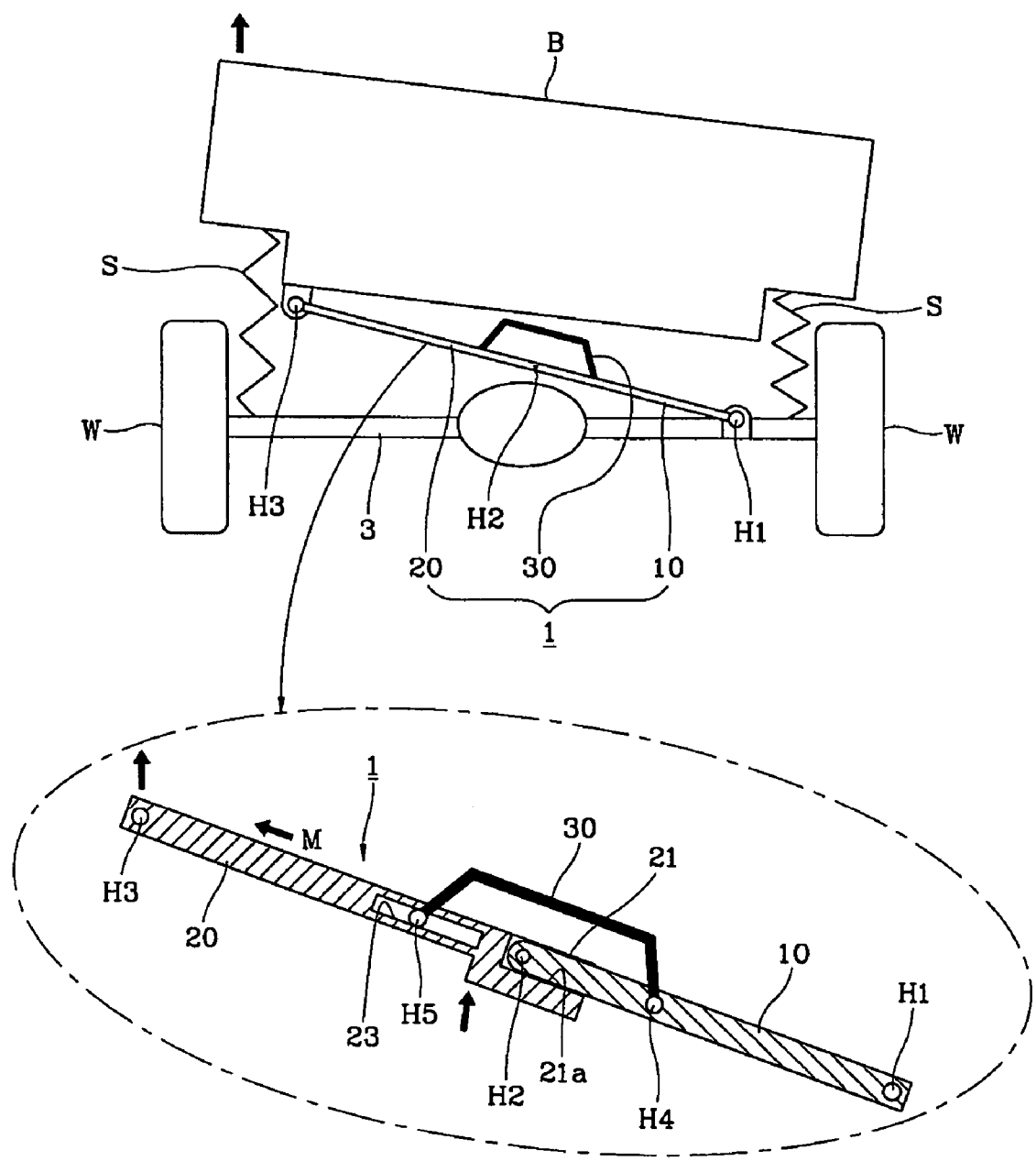
FIG. 2 shows the operation of the lateral link of FIG. 1 when the vehicle is making a tight turn.

Preferably, the connection link 30 approximates a U-shaped structure and positioned such that the medial portion of the connection link 30 protrudes towards the vehicle body B as shown in FIGS. 1-2. This configuration of the connection link 30, serves to limit the angle of rotation of the body coupling link 10 and the body coupling link 20 with respect to each other.

The guide slot 23 extends a predetermined distance longitudinally along the body coupling link 20 and is spaced apart from hinge H2, i.e. the joint between the axle coupling link 10 and the body coupling link 20, and hinge H3, i.e. the joint between the vehicle body B and the body coupling link 20.

The operation and effect of the present invention will be explained in reference to the accompanying drawings, wherein the reference characters W denote left and right rear wheels, and the reference characters S denote coil springs. Referring to FIG. 1 which illustrates when the vehicle is traveling stably, either in a straight line or in a wide turn, the axle coupling link 10 and the body coupling link 20 are in a bent configuration around the hinge H2 at a predetermined angle. When the axle coupling link 10 and the body coupling link 20 are in this bent configuration, the hinge H5, which is coupled to the second end of the connection link 30, comes into contact with an end of the guide slot 23, which prevents it from moving any further towards hinge H3. In the case where a lateral force F1 is applied to the rear suspension system, the lateral link 1 of the preset invention prevents the axle coupling link 10 and the body coupling link 20 from moving in the direction of the lateral force F1, thereby effectively restricting lateral motion of the axle.

Referring to FIG. 2 which illustrates when the vehicle is making a sharp or sudden turn, a jacked-up state is induced so that the vehicle body B is tilted in one direction. As used herein, a jacked-up state refers to the phenomenon wherein one side of the vehicle body B is lifted as compared with the other. When the vehicle is in a jacked-up state, the second end of the body coupling link 20 which is coupled to the vehicle body B by the hinge H3 is lifted along with the vehicle body B as indicated by the upward-pointing arrow in the enlarged view of FIG. 2. The first end of the body coupling link 20 which is coupled to the axle coupling link 10 by the hinge H2 is also lifted upwards while rotating counterclockwise with respect to the axle coupling link 10.

When the hinge H2 is lifted, the body coupling link 20 is moved in the direction indicated by arrow M of FIG. 2 while the hinge H5 travels along the guide slot 23. As a result, the distance between opposite ends of the lateral link 1, as defined by a line connecting hinge H1 and hinge H3, is extended by a certain predetermined length. The increased distance between opposite ends of the lateral link 1 is accompanied by an increase in the radius of rotation of the vehicle body B to be tilted. Note that in a jacked-up state, hinge H1 becomes the axis of rotation around which the vehicle body B is tilted. In this manner, the extent to which the vehicle body B is tilted is greatly attenuated during tight or sudden turns and the controllability and stability of the vehicle in motion is greatly enhanced. The configuration of the lateral link 1 will automatically return to the original state shown in FIG. 1 once the vehicle completes the tight and sudden turn.

As is apparent from the foregoing, the present invention provides a lateral link for suspension systems wherein the distance between opposite ends of the lateral link increases in a tight or sudden turn, so as to enhance controllability, stability, and riding comfort of the vehicle.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth herein.

What is claimed is:

1. A lateral link for vehicle suspension systems, comprising:
    an axle coupling link rotatably coupled at a first end to a rear axle of a vehicle;
    a body coupling link rotatably coupled at a first end to a second end of the axle coupling link and rotatably coupled at a second end to a lower portion of a vehicle body at a position opposite a joint between the rear axle and the axle coupling link; and
    a connection link
        rotatably coupled at a first end to the axle coupling link at a position spaced apart from a joint between the axle coupling link and the body coupling link and the joint between the rear axle and the axle coupling link and
        coupled at a second end to a guide groove formed in the body coupling link, such that the second end of the connection link is movable along the guide groove, wherein the connection link forms a bent configuration such that a medial portion of the connection link protrudes towards the vehicle body.

2. The lateral link of claim 1, wherein the axle coupling link is disposed parallel to the rear axle.

3. The lateral link of claim 1, wherein the axle coupling link is rotatably coupled to a coupling groove formed in the first end of the body coupling link.

4. The lateral link of claim 3, wherein the coupling groove forms a recess wherein the axle coupling link rests when the axle coupling link and the body coupling link are at a maximum rotation with respect to one another, said maximum rotation defined by the recess.

5. The lateral link of claim 1, wherein the guide groove comprises a slot extending a predetermined distance longitudinally along the body coupling link and is spaced a second predetermined distance from the joint between the axle coupling link and the body coupling link and the joint between the vehicle body and the body coupling link.

* * * * *